United States Patent
Bynelius

(10) Patent No.: US 12,134,244 B2
(45) Date of Patent: Nov. 5, 2024

(54) DEVICE FOR COMPRESSING BLOCKS OF INSULATION AND METHOD FOR COMPRESSING BLOCKS OF INSULATION

(71) Applicant: CELLULOSE INSULATION PRODUCTION SCANDINAVIA CPS AB, Djursholm (SE)

(72) Inventor: Jan-Olof Bynelius, Djursholm (SE)

(73) Assignee: CELLULOSE INSULATION PRODUCTION SCANDINAVIA CPS AB, Djursholm (SE)

( * ) Notice: Subject to any disclaimer, the term of this patent is extended or adjusted under 35 U.S.C. 154(b) by 450 days.

(21) Appl. No.: 16/591,095

(22) Filed: Oct. 2, 2019

(65) Prior Publication Data
US 2020/0031080 A1  Jan. 30, 2020

Related U.S. Application Data

(63) Continuation of application No. 15/222,049, filed on Jul. 28, 2016, now abandoned.

(51) Int. Cl.
*B30B 9/30* (2006.01)
*B30B 11/06* (2006.01)
(Continued)

(52) U.S. Cl.
CPC .............. *B30B 9/30* (2013.01); *B30B 9/301* (2013.01); *B30B 9/3025* (2013.01); *B30B 11/06* (2013.01);
(Continued)

(58) Field of Classification Search
CPC ......... B30B 9/30; B30B 9/301; B30B 9/3025; B30B 9/3032; B30B 11/02; B30B 11/025;
(Continued)

(56) References Cited

U.S. PATENT DOCUMENTS

| 3,086,456 A |   | 4/1963 | Englund |
| 3,179,040 A | * | 4/1965 | Seltzer .................. B30B 9/3025 137/489.5 |

(Continued)

FOREIGN PATENT DOCUMENTS

| DE |           10106094 A1 | * | 8/2002 | ........... B30B 9/3025 |
| DE | 202004003704 U1       | * | 6/2004 | ........... B30B 9/3021 |

(Continued)

OTHER PUBLICATIONS

Supplementary European Search Report for corresponding EP Application No. 17834867.8 dated Jul. 24, 2019.

*Primary Examiner* — Jimmy T Nguyen
(74) *Attorney, Agent, or Firm* — NIXON & VANDERHYE P.C.

(57) ABSTRACT

Devices and methods for compressing thermal insulation material into blocks of insulation are disclosed which include a support surface for the compressed blocks of insulation, a compression device with a compression surface, and a feeding device for feeding thermal insulation material. By adapting the compression device for reciprocal movement between a first position, wherein the feeding device is allowed to feed thermal insulation material to a position on the support surface, and a second position, wherein, during movement from the first position to the second position of the compression device, thermal insulation material fed by the feeding device is compressed, highly compressed blocks of thermal insulation material are obtained that are suitable for use with known shredding devices.

8 Claims, 5 Drawing Sheets

(51) Int. Cl.
*B30B 15/00* (2006.01)
*E04B 1/80* (2006.01)
*E04B 1/74* (2006.01)
*E04B 1/76* (2006.01)

(52) U.S. Cl.
CPC ............ *B30B 15/0029* (2013.01); *E04B 1/80* (2013.01); *E04B 2001/745* (2013.01); *E04B 2001/7683* (2013.01); *Y02A 30/244* (2018.01)

(58) Field of Classification Search
CPC ......... B30B 11/04; B30B 11/06; B30B 13/00; B30B 15/0029; B30B 9/3082
See application file for complete search history.

(56) References Cited

U.S. PATENT DOCUMENTS

| | | | | |
|---|---|---|---|---|
| 3,294,013 | A | | 12/1966 | Seltzer |
| 4,040,230 | A | * | 8/1977 | Pessel ........................ B65F 9/00 100/249 |
| 4,037,528 | A | | 9/1977 | White et al. |
| 4,125,071 | A | * | 11/1978 | Young ................. A01F 15/0825 100/191 |
| 4,565,123 | A | * | 1/1986 | Sanders ................ B30B 9/3025 100/50 |
| 4,601,238 | A | * | 7/1986 | Davis, Jr. .................. B30B 9/30 100/249 |
| 4,669,374 | A | * | 6/1987 | Davis, Jr. ............. B30B 9/3096 100/39 |
| 8,109,210 | B2 | | 2/2012 | Strautmann |
| 2007/0180797 | A1 | * | 8/2007 | Hasselbach ............. B65B 63/02 53/529 |
| 2011/0011035 | A1 | | 1/2011 | Praestholm |
| 2013/0020422 | A1 | | 1/2013 | Bynelius |
| 2016/0082683 | A1 | | 3/2016 | Lanning et al. |

FOREIGN PATENT DOCUMENTS

| | | | | |
|---|---|---|---|---|
| EP | 1449639 | A2 * | 8/2004 | ........... B30B 9/3064 |
| FR | 2 242 859 | | 3/1975 | |
| GB | 1285097 | A * | 8/1972 | .......... B30B 9/3007 |
| GB | 2 107 239 | | 4/1983 | |
| WO | WO-02067657 | A1 * | 9/2002 | ............... B30B 1/16 |
| WO | 2011/090422 | | 7/2011 | |
| WO | 2013/019168 | | 2/2013 | |
| WO | 2014/003635 | | 1/2014 | |
| WO | 2016/005465 | | 1/2016 | |

* cited by examiner even more compressed loose-fill material in an insulation apparatus according to the above description.

The above mentioned difficulty is addressed by shredding devices designed by the applicant and a method using such device, see the international patent publications WO2011/090422A1 and WO2014/003635, incorporated herein by reference. The shredding devices comprise a rotatable shredder cylinder with protruding pins which is adapted to grate, pick apart and fluff the insulation from a compressed block format into a fluff material with an even density.

DEVICE FOR COMPRESSING BLOCKS OF INSULATION AND METHOD FOR COMPRESSING BLOCKS OF INSULATION

CROSS-REFERENCE

This application is a continuation of commonly owned U.S. application Ser. No. 15/222,049, filed Jul. 28, 2016 (now abandoned), the entire content of which is hereby incorporated by reference.

TECHNICAL FIELD

The present invention relates to a device for compressing thermal insulation material, preferably loose-fill cellulose thermal insulation, into blocks of insulation, and a method for compressing loose-fill cellulose thermal insulation material.

BACKGROUND ART

Loose-fill insulation is used to insulate structures and buildings and is a quick and convenient alternative to insulation with mineral wool isolation batts. The loose-fill insulation is with the assistance of compressed air blown by an insulation apparatus into cavities in the building structure, such as for example into walls and on attics, forming a heat and cold insulation layer. In order for the cellulosic fibers to be able to withstand the various conditions in building structures it is treated with various additives having fire retardant and other properties. Cellulosic fibers are organic and are therefore an environmental friendly and renewable insulation material. Loose-fill cellulose thermal insulation is mainly made out of recycled newspapers. These cut pieces of paper are easy and economic to produce and have a good insulation capacity at a relatively low density.

A known method of insulating building structures with loose-fill cellulose thermal insulation material can be described as follows. The loose-fill cellulose thermal insulation material is compressed into a density of 90-140 kg/m3 and put into bags to be transported to the building site. At the building site the bag is opened and the material is put into a hopper arranged in the insulation apparatus. In the hopper there is a device for picking apart and fluff up the compressed cellulose thermal insulation material into a density and form possible to blow into the building elements by using a compressed air source. The device for fluffing up the compressed cellulose thermal insulation material has in most insulation apparatuses been one or several rotating arms making a horizontal vortex in the material. Due to the power needed to break apart pieces from the compressed material, the engine driving the rotating arms has been forced to be very powerful. With relatively long arms it is also difficult to receive an even density of the fluffed insulation material. A material with an uneven density containing lumps of material is difficult to distribute into the structure.

Normally the transportation to the building site is made by a truck and semitrailer. A material with a density of 90-140 kg/m3 contains a large amount of air and only fills 30-50% of the trailer volume. It is therefore desirable used loose-fill insulation material compressed to a greater extent. However, due to the great amount of energy needed to break apart a compressed material it is difficult to use an even more compressed loose-fill material in an insulation apparatus according to the above description.

SUMMARY OF INVENTION

An object of the present invention is to create a device and a method for creating highly compressed block of loose-fill cellulose thermal insulation material that are suitable for use with the known shredding devices.

These objects are achieved by a device and a method according to the appended claims.

According to a first aspect of the invention, a device for compressing thermal insulation material into blocks of insulation is provided, the device comprising: a support surface for the compressed blocks of insulation, a compression device with a compression surface, and a feeding device for feeding thermal insulation material, the device being characterized in that the compression device is adapted for reciprocal movement between a first position, wherein the feeding device is allowed to feed thermal insulation material to a position on the support surface, and a second position, wherein, during movement from the first position to the second position of the compression device, thermal insulation material fed by the feeding device is compressed.

In a preferred embodiment, the thermal insulation material is loose-fill cellulose thermal insulation material.

In a preferred embodiment, the compression surface is provided with protrusions, such as ribs or nail-like protrusions. Thereby, the different portions of a block of insulation adhere to each other.

In a preferred embodiment, the device comprises a driving device for operating the compression device by hydraulic, pneumatic or electrical power, such as a rotating electrical machine.

In a preferred embodiment, the device comprises means for adjusting a cross-sectional area of compressed thermal insulation material. Thereby, the rate of compression of the thermal insulation material can be adjusted. Preferably, the means for adjusting a cross-sectional area of compressed thermal insulation material comprises an adjustable wall, preferably a vertically adjustable upper wall, which, when the adjustable wall is adjusted, adjusts the area of an opening defined by the adjustable wall, two side walls and the support surface. This provides for a mechanically simple design.

According to a second aspect of the invention, a method for compressing loose-fill cellulose thermal insulation material into a block is provided, the method being characterized by the steps: a) feeding an amount of thermal insulation material to a support surface, b) compressing the amount of thermal insulation material fed in step a), thereby creating a block of insulation, c) feeding an additional amount of thermal insulation material to the support surface, compressing the additional amount of thermal insulation material fed in step c), d) adding compressed thermal insulation material to the block of insulation, and e) repeating steps c) and d) until the block of insulation has a predetermined size.

In a preferred embodiment, the thermal insulation material is compressed to a density of at least 160 kg/m3.

In a preferred embodiment, each portion of the block is compressed to a thickness of between 1.25 and 2.5 cm (0.5-1.0 inch).

Please note that all the embodiments or features of an embodiment as well as any method or step of a method could be combined in any way if such combination is not clearly contradictory.

BRIEF DESCRIPTION OF DRAWINGS

The invention is now described, by way of example, with reference to the accompanying drawings, in which.

DESCRIPTION OF EMBODIMENTS

The invention will now be described in more detail in respect of embodiments and in reference to the accompanying drawings. All examples herein should be seen as part of the general description and therefore possible to combine in any way in general terms. Again, individual features of the various embodiments may be combined or exchanged unless such combination or exchange is clearly contradictory to the overall function of the device.

Figure 1A:
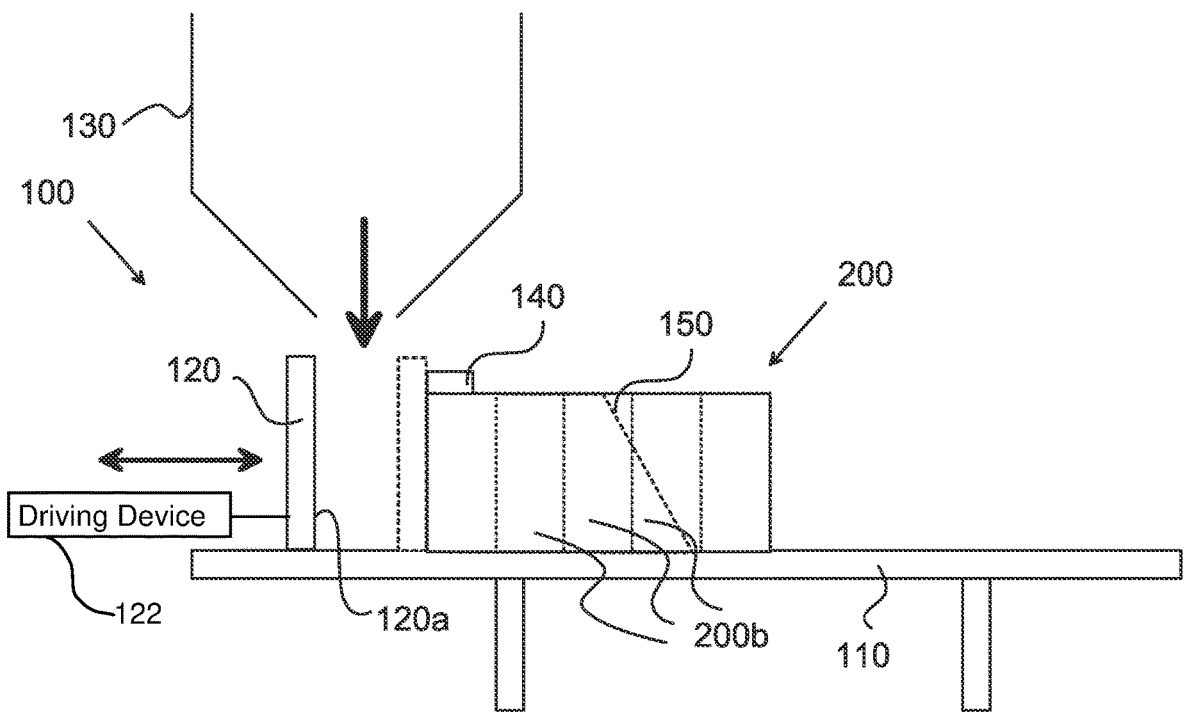
FIGS. 1a and 1b show a side view and an end view, respectively, of an embodiment of a device for compressing blocks of insulation material.

FIG. 1a shows a device 100 for compressing thermal insulation material into blocks of insulation. The device comprises a support surface 110 for compressed blocks of insulation, of which one designated 200 is shown in the figure. The compressed block of insulation 200 is comprised of several portions 200b, as will be described below. The support surface 110 is in the embodiment shown in FIG. 1 essentially horizontal, but it could also be slanting. Two side walls 150, one of which is shown with dashed lines, are provided on the support surface 110.

A compression device 120 with a compression surface 120a is provided near a first end of the support surface 110. The compression device 120 is adapted for reciprocal movement between a first position, shown with solid lines in the figure, and a second position, shown with dashed lines in the figure. The compression device 120 is operated by means of a driving device 122 which may be in the form of a hydraulic, pneumatic or electrical power, such as a rotating electrical machine.

A feeding device 130 is provided for feeding thermal insulation material, preferably loose-fill cellulose thermal insulation material, to a position on the support surface 110 between the first and second positions of the compression device 120. Thus, the feeding device 130 is allowed to feed thermal insulation material to this position on the support surface 110 when the compression device is in the first position.

Figure 1B:
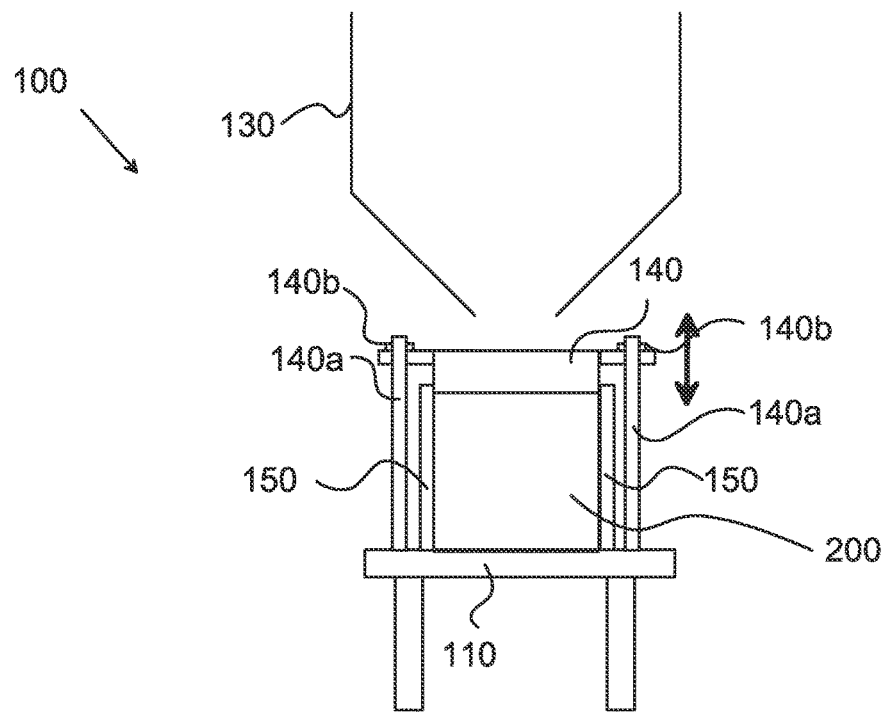

During movement from the first position to the second position of the compression device, thermal insulation material fed by the feeding device 130 is compressed. The degree of compression can be controlled by adjusting the cross-sectional area of the compressed material by means of an adjustable upper wall 140, which can be adjusted vertically. In a preferred embodiment, this is effected by means of two screws 140a, see FIG. 1b, showing an end view of the device 100 for compressing thermal insulation material, onto which a respective nut 140b is threaded. By means of adjusting the positions of the nuts 140b, the vertical position of the adjustable upper wall 140 is adjusted, which in turn adjusts the area of the opening defined by the upper wall 140, the two side walls 150 and the support surface 110. It is preferred that the thermal insulation material is compressed to a density of at least 160 kg/m$^3$.

With reference to FIGS. 2a-f, the operation of the device 100 for compressing thermal insulation material will be explained in detail. First, in FIG. 2a, an amount of thermal insulation material 200a is fed by the feeding device 130 onto the support surface 110 with the compression device 120 in the first position. The compression device 120 is then rapidly moved from the first position to the second position, shown in FIG. 2b. With this movement, the thermal insulation material 200a is compressed, thereby creating a block of insulation 200, see FIG. 2b. It should be noted that no counter-support is needed for this compression, i.e., the thermal insulation material 200a is compressed due to the nature of the movement of the compression device 120. However, the first portion 200b created in the first cycle may get an uneven shape and compression, as indicated by the figures.

Figure 2A:
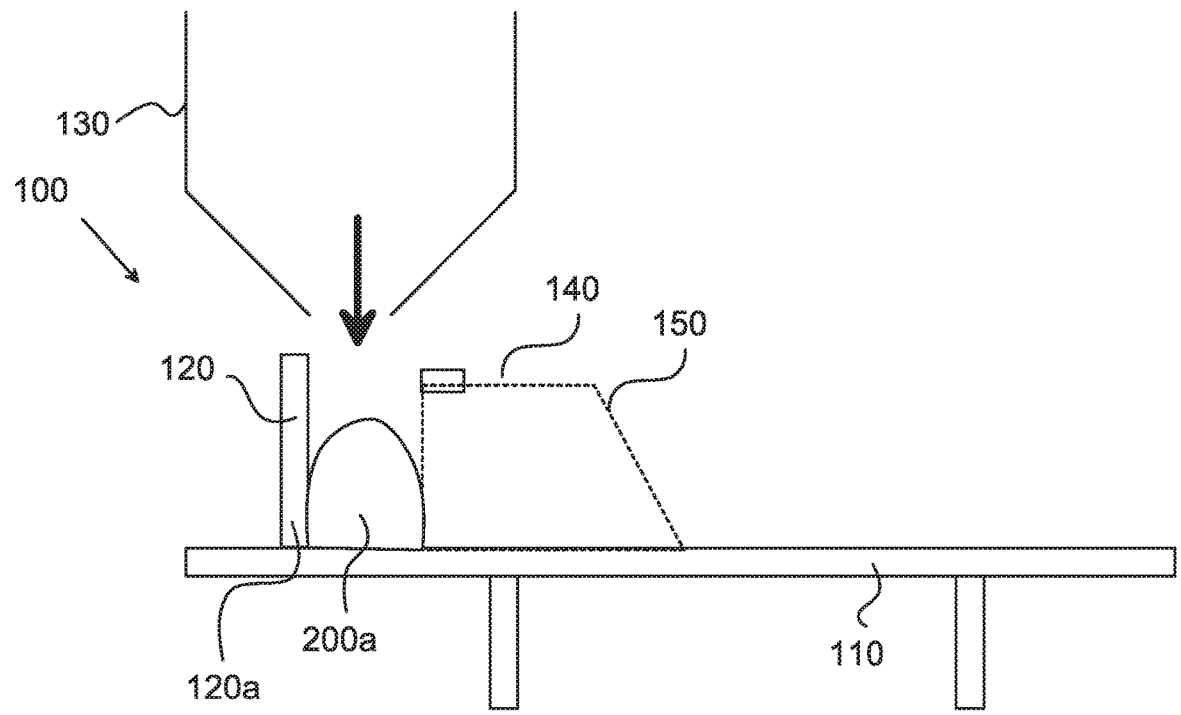
FIGS. 2a-f shows different the steps in the method of compressing thermal insulation material according to the invention by means of the device shown in FIGS. 1a and 1b.
Figure 2B:
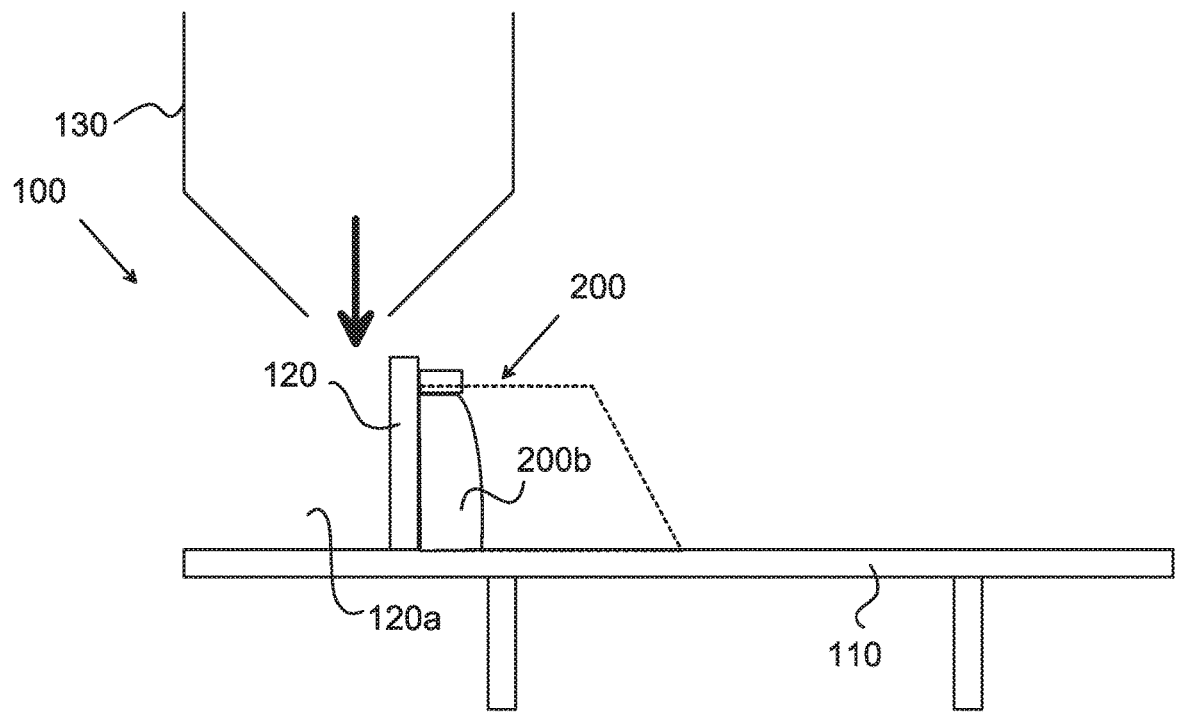
Figure 2C:
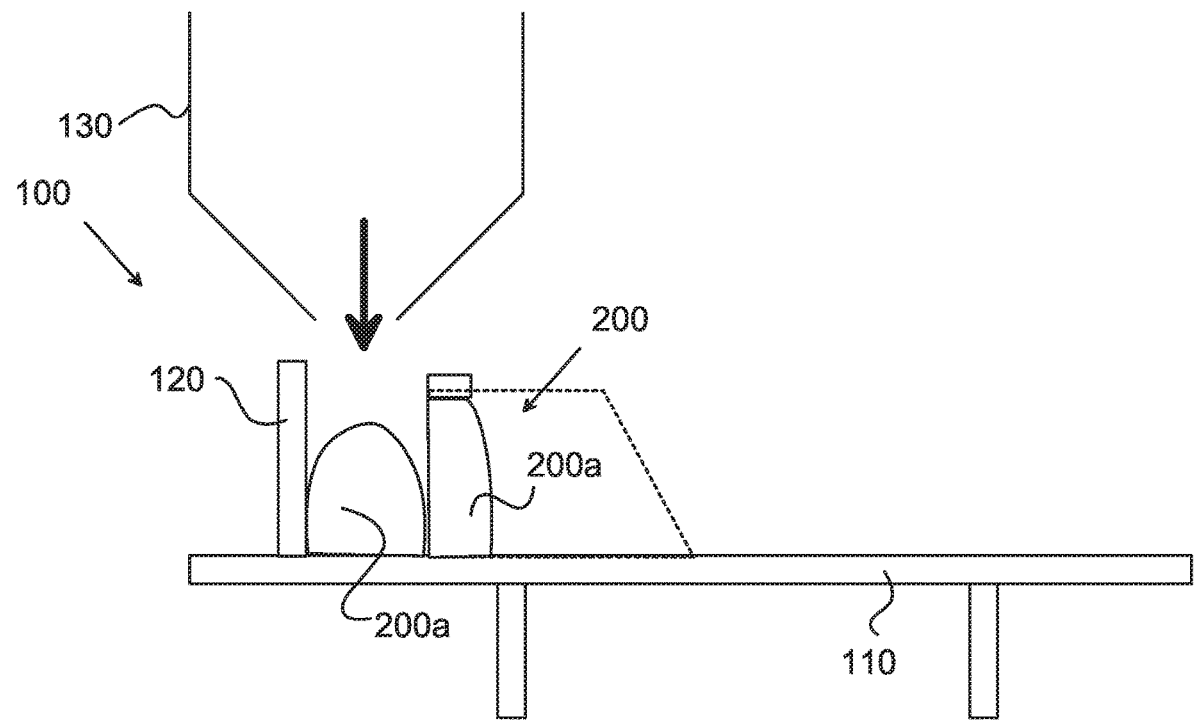

In FIG. 2c the compression device 120 has been moved to the first position and an additional amount of thermal insulation material 200a is fed to the support surface 110. The compression device 120 is then rapidly moved from the first position to the second position, shown in FIG. 2d. With this movement, the thermal insulation material 200a is compressed, thereby creating a block of insulation 200 comprised both of the block or portion created in the first cycle described above with reference to FIGS. 2a and 2b and the additional portion 200b added in the cycle described with reference to FIGS. 2c and 2d. This second portion created in the second cycle adheres to the first portion created in the first cycle, creating a block 200 comprised by two portions 200b adhering to each other.

Figure 2D:
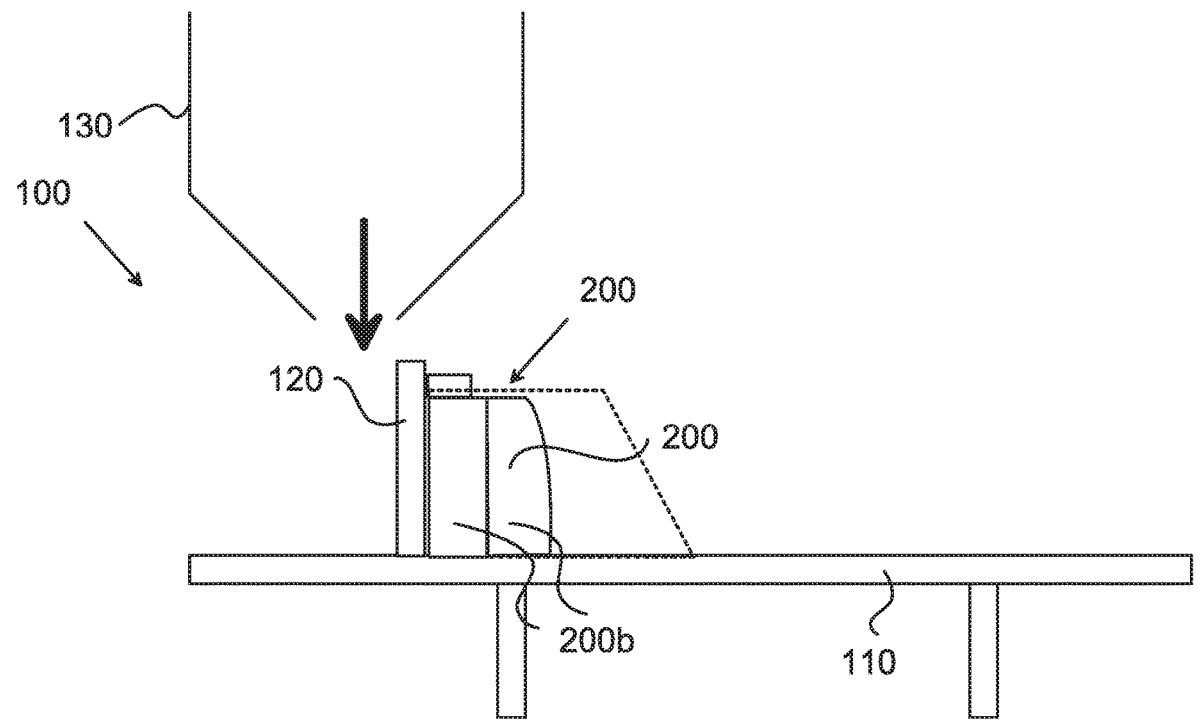

In the second cycle described with reference to FIGS. 2c and 2d, the first portion 200b functions as a counter-support, improving the compression of the second portion 200b. It will be realized that the first portion 200b is displaced to the right in the figure during the compression of the second portion 200b.

Figure 2E:
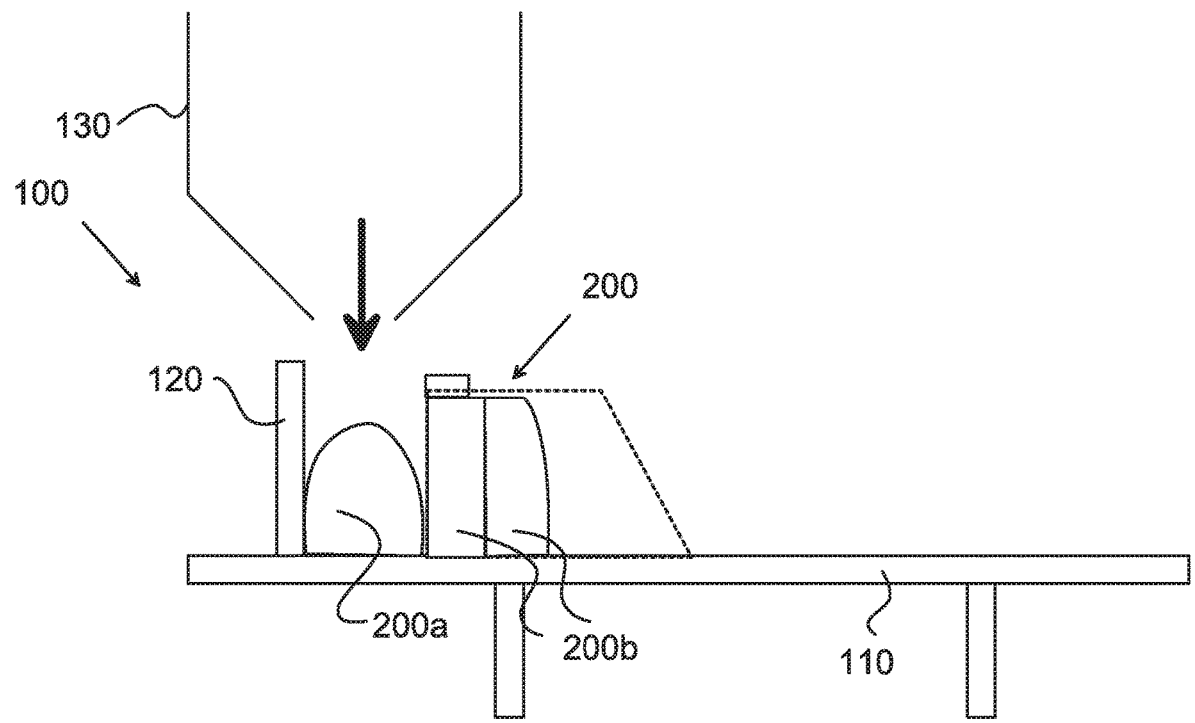
Figure 2F:
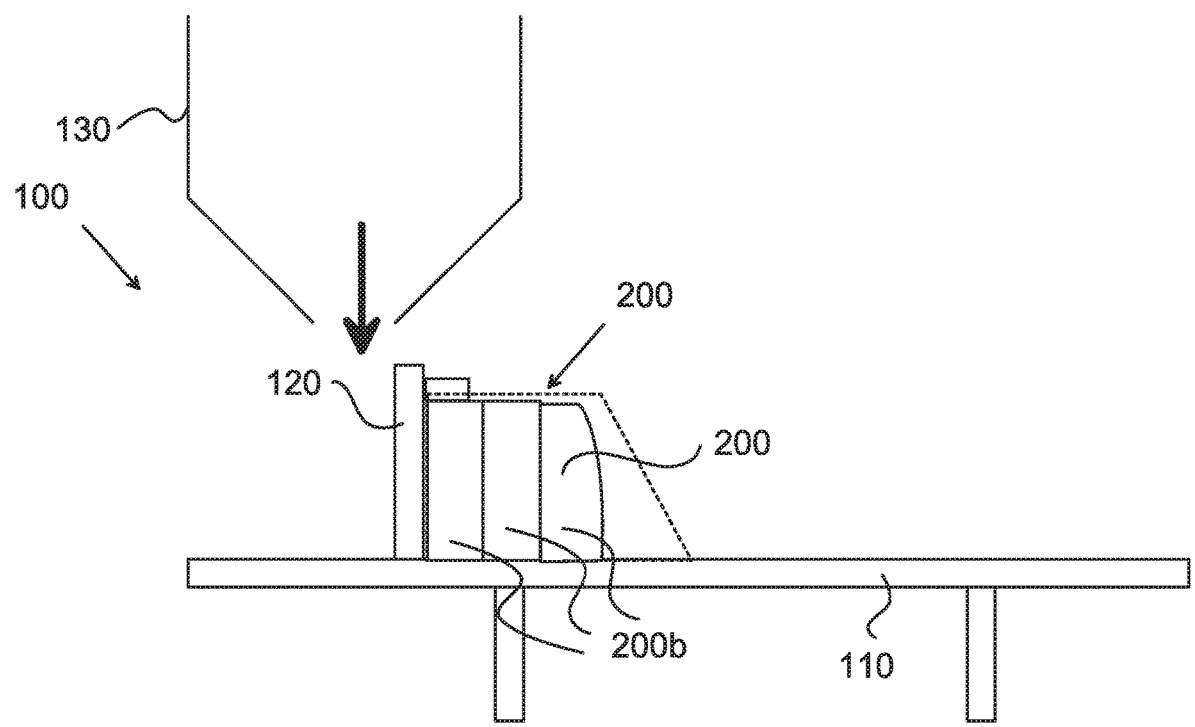

In FIG. 2e the compression device 120 has again been moved to the first position and an additional amount of thermal insulation material 200a is fed to the support surface 110. The compression device 120 is then rapidly moved from the first position to the second position, shown in FIG. 2f. With this movement, the thermal insulation material 200a is compressed, thereby creating a block of insulation 200 comprised both of the block created in the first cycle described above with reference to FIGS. 2a and 2b, the second cycle described above with reference to FIGS. 2c and 2d and the additional portion added in the cycle described with reference to FIGS. 2e and 2f.

This procedure is repeated until the block of insulation 200 obtains a predetermined, i.e., desired size.

Each portion 200b of the block 200 has a thickness or extension in the longitudinal direction of the block 200 depending on the amount of thermal insulation material fed in each cycle, the speed, power and distance of the movement of the compression device 120, the cross-sectional area of the block 200 etc. In a preferred embodiment, each portion of the block 200 is between 1.25 and 2.5 cm (0.5-1.0 inch). Thus, it is appreciated that the figures are not to scale.

Figure 3:
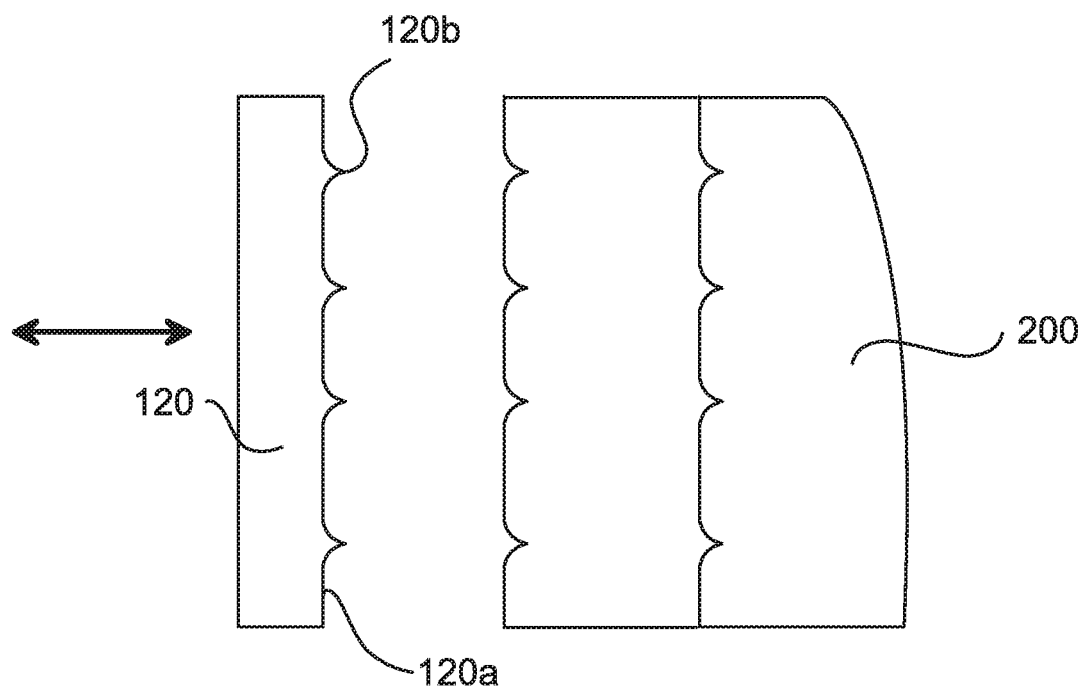
FIG. 3 shows an enlarged view of a compression device comprised in the device for compression blocks shown in FIGS. 1a and 1b and a compressed block created by means of the compression device.

In order to achieve bonding between the different portions of the block 200, the compression surface 120a may be provided with protrusions 120b, such as ribs or nail-like protrusions. This creates an uneven interface between two adjacent portions of the block 120, such as the one shown in FIG. 3, showing a sectional view of the block 200 shown in FIG. 2*d*.

The division of the compressed block of insulation 200 into several portions 200*b* facilitates shredding of the block by means of a shredding device, such as the ones referred to in the background art section.

A device 100 for compressing thermal insulation material for creating a single compressed block of insulation 200 of has been shown and described. It will be realized that two or more such devices may be provided in parallel, using the power of a single driving device to effect the reciprocal movement of the compression device.

The invention claimed is:

1. A device for compressing loose-fill cellulose thermal insulation material into blocks of insulation comprising:
   a support surface having a first surface region for receiving and supporting loose-fill cellulose thermal insulation material thereon and a second surface region for supporting thereon compressed blocks of cellulose thermal insulation,
   a compression device defining a compression surface, wherein the compression surface is configured to compress the loose-fill cellulose thermal insulation material into the compressed blocks of cellulose thermal insulation having a density of at least 160 kg/m$^3$ while the cellulose thermal insulation material is supported on the support surface,
   a feeding device for feeding the loose-fill thermal insulation material onto the support surface at the first surface region thereof, and
   means for adjusting a cross-sectional area of the blocks of compressed cellulose thermal insulation material comprising an adjustable wall and at least one screw which are configured to allow vertical adjustment of the adjustable wall at an entrance of an opening defined by the adjustable wall, two side walls and the support surface, wherein
   the compression device is adapted for reciprocal movement in a direction parallel to the support surface between a first position, wherein the compression device is positioned near the first surface region of the support surface to allow the feeding device to feed the loose-fill cellulose thermal insulation material onto the first surface region of the support surface, and a second position near the second surface region of the support surface, and wherein
   during movement of the compression device from the first position to the second position thereof, the loose-fill cellulose thermal insulation material fed by the feeding device onto the first surface region of the support surface is compressed into the compressed blocks of cellulose thermal material at the second surface region of the support surface.

2. The device according to claim 1, wherein the compression surface is provided with protrusions.

3. The device according to claim 1, comprising a driving device for operating the compression device by hydraulic, pneumatic or electrical power.

4. The device according to claim 2, wherein the protrusions are ribs or nail-like protrusions.

5. The device according to claim 1, wherein the adjustable wall is a vertically adjustable upper wall.

6. A method for compressing loose-fill cellulose thermal insulation material into a compressed block of cellulose thermal insulation having a predetermined size, wherein the method comprises the steps of:
   a) providing a support surface having a first surface region for receiving and supporting loose-fill cellulose thermal insulation material thereon and a second surface region for supporting thereon a compressed block of cellulose thermal insulation;
   b) feeding an amount of the loose-fill cellulose thermal insulation material onto the first surface region of the support surface with a feeding device,
   c) compressing the amount of loose-fill cellulose thermal insulation material fed in step a) by moving a compression device in a direction parallel to the support surface between a first position, wherein the compression device is positioned near the first surface region of the support surface to allow the loose-fill cellulose thermal insulation material to be fed onto the first surface region of the support surface, and a second position near the second surface region of the support surface to thereby form an initial block of thermal insulation,
   d) feeding an additional amount of the loose-fill cellulose thermal insulation material to the first surface region of the support surface while the compression device is in the first position thereof,
   e) compressing the additional amount of loose-fill cellulose thermal insulation material fed onto the first surface region of the support surface according to step d) to add additional compressed cellulose thermal insulation material to the initial block of cellulose thermal insulation and form a block of cellulose thermal insulation having increased size, and
   f) repeating steps d) and e) to until the compressed block of cellulose thermal insulation has a predetermined size and a density of at least 160 kg/m$^3$, and wherein
   the method further comprises a step of adjusting a cross-sectional area of the compressed block of thermal insulation material by an adjusting means comprised of two side walls, the support surface, an adjustable wall and at least one screw which are configured to allow vertical adjustment of the adjustable wall at an entrance of an opening defined by the adjustable wall, the two side walls and the support surface.

7. The method according to claim 6, wherein the additional amount of thermal insulation material compressed in step e) is compressed to a thickness of between 0.5-1.0 inch.

8. The method according to claim 6, wherein the compressing steps c) and e) are performed with no counter-support.

* * * * *